US012785131B2

(12) United States Patent
Jo et al.

(10) Patent No.: US 12,785,131 B2
(45) Date of Patent: Nov. 3, 2026

(54) WINDING APPARATUS FOR SECONDARY BATTERIES

(71) Applicant: SAMSUNG SDI CO., LTD., Yongin-si (KR)

(72) Inventors: Myeong Jun Jo, Yongin-si (KR); Eon Woo Park, Yongin-si (KR); Yeon Bok Jeong, Yongin-si (KR); Kyeong Yun Park, Yongin-si (KR); Min Seung Kang, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 191 days.

(21) Appl. No.: 18/739,457

(22) Filed: Jun. 11, 2024

(65) Prior Publication Data

US 2025/0201898 A1 Jun. 19, 2025

(30) Foreign Application Priority Data

Dec. 13, 2023 (KR) ........................ 10-2023-0180380

(51) Int. Cl.
*H01M 10/04* (2006.01)
*B65H 18/10* (2006.01)
*B65H 39/16* (2006.01)

(52) U.S. Cl.
CPC ...... *H01M 10/0409* (2013.01); *B65H 18/103* (2013.01); *B65H 39/16* (2013.01); *B65H 2301/414* (2013.01); *B65H 2301/414225* (2013.01); *B65H 2405/57* (2013.01); *B65H 2701/19* (2013.01); *B65H 2701/1918* (2013.01)

(58) Field of Classification Search
CPC ............. H01M 10/04; H01M 10/0409; H01M 10/0587; B65H 18/103
See application file for complete search history.

(56) References Cited

U.S. PATENT DOCUMENTS

| | | | | |
|---|---|---|---|---|
| 9,899,707 | B2 | 2/2018 | Kim et al. | |
| 12,002,919 | B2 * | 6/2024 | Zhang | H01M 10/0431 |
| 12,355,027 | B2 * | 7/2025 | Zhang | H01M 10/0409 |
| 2011/0297780 | A1 * | 12/2011 | Feng | H01M 6/005 242/444 |
| 2023/0361335 | A1 * | 11/2023 | Zhang | H01M 10/0409 |
| 2023/0378513 | A1 * | 11/2023 | Zhang | H01M 10/0409 |

FOREIGN PATENT DOCUMENTS

| | | | |
|---|---|---|---|
| KR | 10-0659875 | B1 | 11/2006 |
| KR | 10-2172844 | B1 | 9/2015 |
| KR | 10-2499324 | B1 | 5/2017 |
| KR | 10-2458069 | B1 | 10/2022 |

* cited by examiner

*Primary Examiner* — Sang K Kim
(74) *Attorney, Agent, or Firm* — Lee IP Law, P.C.

(57) ABSTRACT

A winding apparatus for secondary batteries includes a first clamp having a first contact portion to be in contact with a separator in a longitudinal direction, a second clamp having a second contact portion to be in contact with the separator in the longitudinal direction, the second contact portion being configured to be engaged with the first contact portion while the separator is therebetween, blades surrounding the first clamp and the second clamp, the blades being configured to allow the separator to be wound therearound, and a driver configured to move the first clamp and the second clamp toward each other and away from each other.

13 Claims, 5 Drawing Sheets

WINDING APPARATUS FOR SECONDARY BATTERIES

CROSS-REFERENCE TO THE RELATED APPLICATION

The present application claims priority to and the benefit of Korean Patent Application No. 10-2023-0180380, filed on Dec. 13, 2023, in the Korean Intellectual Property Office, the entire disclosure of which is incorporated herein by reference.

BACKGROUND

1. Field

Embodiments relate to a winding apparatus for secondary batteries capable of reducing poor ejection of an electrode assembly in a process of winding the electrode assembly.

2. Description of the Related Art

An electrode assembly for secondary batteries may include a negative electrode plate and a positive electrode plate that are cylindrically wound or stacked in a state of being insulated from each other by a separator. A winding apparatus for winding a wound type electrode assembly may be provided with a clamp configured to fix an end of the separator to a winding center of the electrode assembly. After the clamp fixes the end of the separator, the winding apparatus may wind the electrode assembly into a cylindrical shape. After winding is completed, the electrode assembly is removed from the winding apparatus.

The information disclosed in this section is provided only for enhancement of understanding of the background of the disclosure and therefore it may contain information that does not form the prior art.

SUMMARY

Aspects of embodiments provide a winding apparatus for secondary batteries, including a first clamp including a first contact portion to be in contact with a separator in a longitudinal direction, a second clamp including a second contact portion to be in contact with the separator in the longitudinal direction, the second contact portion being configured to be engaged with the first contact portion while the separator is therebetween, blades surrounding the first clamp and the second clamp, the blades being configured to allow the separator to be wound therearound, and a driver configured to move the first clamp and the second clamp toward each other and away from each other.

The first contact portion may have two protrusions and a recess between the two protrusions, as viewed in a cross-sectional view.

The second contact portion may have one protrusion protruding from a center of a surface thereof, as viewed in the cross-sectional view.

Each of the two protrusions of the first contact portion and the one protrusion of the second contact portion may have a round shape with a predetermined R value on an outside thereof.

Aspects of embodiments also provide a winding apparatus for secondary batteries, including a supplier configured to supply an electrode strip, the electrode strip including a first electrode plate, a second electrode plate, and separators overlapped in a predetermined order, and a winder including a plurality of clamps, a plurality of blades outside the plurality of clamps, and a plurality of support members coupled to the plurality of clamps and the plurality of blades, the plurality of blades being coupled to the plurality of clamps and configured to support the electrode strip wound therearound, and the plurality of support members being configured to support the plurality of clamps and the plurality of blades, wherein each of the plurality of clamps has a contact portion in contact with one end of the electrode strip, and the plurality of clamps are engaged with each other to hold the electrode strip.

The plurality of clamps may include a first clamp including at least one first contact portion in contact with the one end of the electrode strip, and a second clamp including a second contact portion in contact with the one end of the electrode strip.

The at least one first contact portion may include a pair of first contact portions at one end of the first clamp in a longitudinal direction, the pair of first contact portions symmetrically faces each other with a recess therebetween.

Each of the pair of first contact portions may include a first inclined surface inclined from one surface of the first clamp, a contact surface connected to the first inclined surface, the contact surface being configured to be in contact with the electrode strip, and a second inclined surface connected to the contact surface, the second inclined surface being opposite the first inclined surface.

Each of a boundary between the first inclined surface and the contact surface and a boundary between the contact surface and the second inclined surface may have a round shape with a predetermined R value.

The second contact portion may be at one end of the second clamp in a longitudinal direction, the second contact portion protruding from a center of a surface of the second clamp.

The second contact portion may have a round shape with a predetermined R value.

The electrode strip may be configured such that one end of the separator protrudes longer than one end of the first electrode plate and one end of the second electrode plate in a longitudinal direction.

The protruding one end of the separator of the electrode strip may be held by the clamps.

The winding apparatus may further include a pair of hinge brackets rotatably supporting the plurality of blades, and a pair of holders at opposite ends of the pair of hinge brackets, respectively, the pair pf holders supporting the pair of hinge brackets, the plurality of clamps, and the plurality of blades.

The driver may include the pair of hinge brackets and a pair of side guide plates facing each other, the side guide plates rotatably supporting the pair of hinge brackets in opposite directions, and the winding apparatus may further include a pair of top covers and a pair of side covers outside the pair of side guide plates, the pair of top covers and the pair of side covers covering the pair of hinge brackets and the pair of side guide plates.

BRIEF DESCRIPTION OF THE DRAWINGS

Features will become apparent to those of skill in the art by describing in detail exemplary embodiments with reference to the attached drawings, in which.

DETAILED DESCRIPTION

Figure 1:
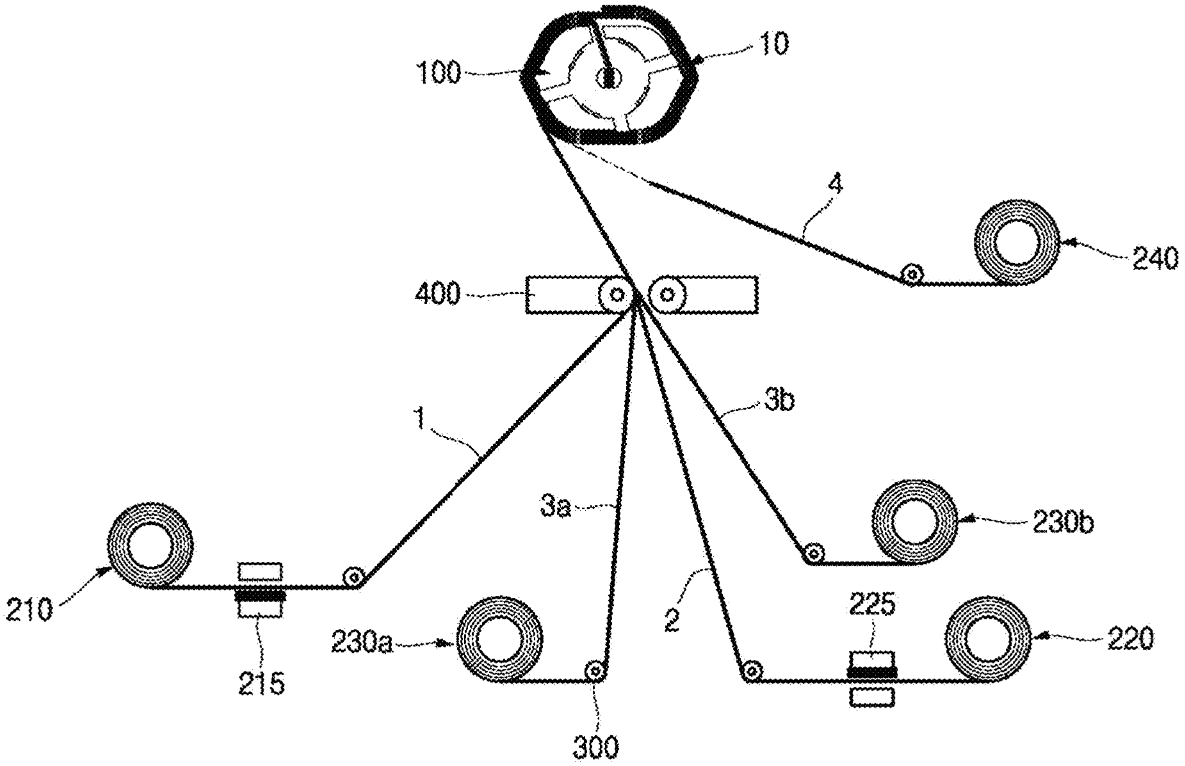
FIG. 1 is a schematic view of a winding apparatus according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the term "and/or" includes any one of the enumerated items and any combination of one or more thereof. As used herein, the term "connected" refers not only to direct connection between members A and B but also to indirect connection between members A and B with member C interposed therebetween.

The terms used in the specification are intended to describe specific embodiments and are not intended to limit the disclosure. As used herein, singular forms may include plural forms, unless the context clearly indicates otherwise. As used herein, the terms "comprise" (or "include") and/or "comprising" (or "including") are intended to specify the presence of stated figures, numbers, steps, operations, members, elements, and/or groups thereof and do not exclude the presence or addition of one or more other figures, numbers, steps, operations, members, elements, and/or groups.

While terms such as first and second are used herein to describe various members, parts, regions, layers, and/or portions, the members, the parts, the regions, the layers, and/or the portions are not to be limited by the terms. The terms are used only to distinguish one member, one part, one region, one layer, or one portion from another member, another part, another region, another layer, or another portion. Thus, a first member, a first part, a first region, a first layer, or a first portion hereinafter described may refer to a second member, a second part, a second region, a second layer, or a second portion without departing from the teachings of the disclosure.

Terms related to space, such as "beneath," "below," "lower," "above," and "upper," may be utilized to facilitate understanding of one element or feature shown in the drawings as different from another element or feature. The terms related to space are intended to facilitate understanding of the disclosure in various states of process or use and are not intended to limit the disclosure. For example, if an element or feature in a figure is inverted, an element or feature described as "beneath" or "below" becomes "above" or "upper." Thus, "beneath" is a concept that encompasses "above" or "below".

Hereinafter, a winding apparatus for secondary batteries according to an embodiment will be described in detail with reference to the accompanying drawings.

Figure 2:
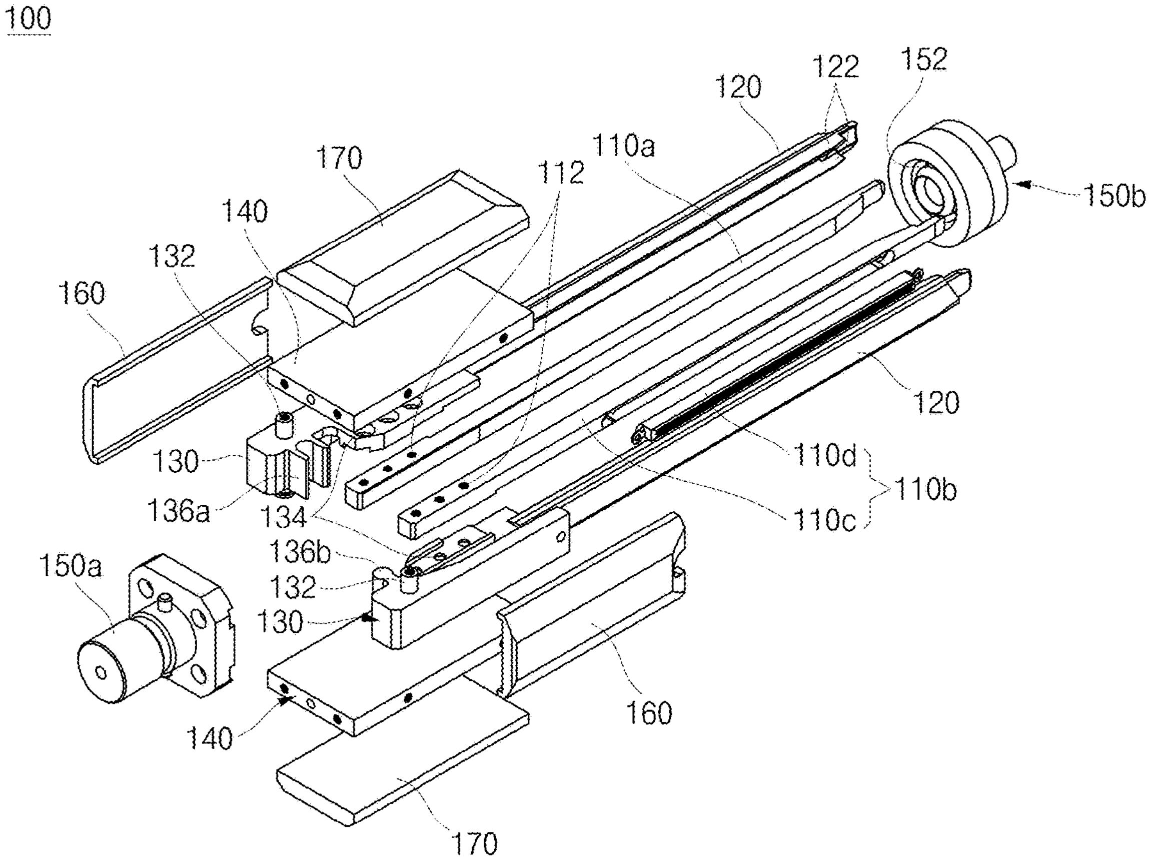
FIG. 2 is an exploded perspective view of a winding unit of the winding apparatus according to an embodiment.

FIG. 1 is a schematic view of a winding apparatus according to an embodiment. FIG. 2 is an exploded perspective view of a winding unit (i.e., a winder) f the winding apparatus according to an embodiment.

Referring to FIG. 1, a winding apparatus according to the embodiment may include a winding unit 100, a plurality of supply units 210, 220, 230*a*, 230*b*, and 240, a plurality of transfer rollers 300, and a cutting unit 400. The winding unit 100 may wind a first electrode plate 1, a second electrode plate 2, and separators 3*a* and 3*b* supplied respectively from the supply units 210, 220, 230*a*, and 230*b* in a state of being overlapped in a predetermined order.

The supply units 210, 220, 230*a*, 230*b*, and 240 (i.e., suppliers) may supply the first electrode plate 1, the second electrode plate 2, the plurality of separators 3*a* and 3*b*, and a fixing tape 4, respectively. The first electrode plate 1, the second electrode plate 2, and the separators 3*a* and 3*b* may be supported by the plurality of transfer rollers 300, and may be guided to the winding unit 100. The first electrode plate 1, the second electrode plate 2, and the separators 3*a* and 3*b* may be overlapped in the predetermined order, and may be supplied to the winding unit 100 as a single strip. For example, before the first electrode plate 1, the second electrode plate 2, and the separators 3*a* and 3*b* are overlapped with each other, electrode tabs may be attached to the first electrode plate 1 and the second electrode plate 2 by electrode tab attachment units 215 and 225, respectively. In another example, uncoated portions of the first electrode plate 1 and the second electrode plate 2 having no active materials may be processed to form base tabs without attaching the electrode tabs.

The cutting unit 400 may gather the first electrode plate 1, the second electrode plate 2, and the separators 3*a* and 3*b* supplied respectively from the supply units 210, 220, 230*a*, and 230*b* into a single strip state, and may cut the same to a predetermined length. For example, a stack of the first electrode plate 1, the second electrode plate 2, and the separators 3*a* and 3*b* gathered into a single strip state may be referred to as an electrode strip for convenience. The electrode strip may be supplied to the winding unit 100, may be fixed at an end thereof, and may be wound by rotation of the winding unit 100. After winding is completed, the electrode strip may be cut by the cutting unit 400, and the fixing tape 4 may be attached to the electrode strip such that the wound state of the electrode strip is maintained. The electrode assembly 10 may be separated from the winding unit 100, and a subsequent manufacturing process may be performed.

The first electrode plate 1 may be a positive electrode or a negative electrode. For example, the first electrode plate 1 may be a positive electrode. The first electrode plate 1 may be provided with a positive electrode active material layer made of a transition metal oxide formed on at least one surface of a flat metal foil made of aluminum (Al). The first electrode plate 1 may be provided at one side thereof in a longitudinal direction with an uncoated portion having no positive electrode active material layer.

The second electrode plate 2 may be a negative electrode or a positive electrode. For example, the second electrode plate 2 may be a negative electrode. The second electrode plate 2 may be provided with a negative electrode active material layer made of graphite or carbon formed on at least one surface of a flat metal foil made of copper (Cu) or nickel (Ni). The second electrode plate 2 may be provided at one side thereof in a longitudinal direction with an uncoated portion having no negative electrode active material layer.

Each of the separators 3*a* and 3*b* may be, e.g., polyethylene (PE) or polypropylene (PP). Each of the separators 3*a* and 3*b* may prevent electrical short circuit between the first electrode plate 1 and the second electrode plate 2, and may allow only movement of lithium ions during operation of a secondary battery.

For winding of the electrode assembly 10, the first electrode plate 1 and the second electrode plate 2 may be insulated from each other to prevent short circuit therebetween. For example, the uncoated portion of the first electrode plate 1 may protrude from one side of the electrode strip in a lateral direction while the first separator 3*a* is interposed between the first electrode plate 1 and the second electrode plate 2. The uncoated portion of the second electrode plate 2 may protrude from the other side of the electrode strip in the lateral direction (direction opposite the direction in which the uncoated portion of the first electrode plate protrudes). The second separator 3*b* may be disposed at the innermost side in a winding direction. The first separator 3*a* and the second separator 3*b* may be ejected from the supply units 230*a* and 230*b* earlier than the first electrode plate 1 and the second electrode plate 2. The electrode strip may be formed with the first separator 3*a* and the second separator 3*b* protruding longer than the winding start ends of the first electrode plate 1 and the second electrode plate 2 in the longitudinal direction of the electrode strip. The end of the electrode strip thus formed may be fixed to the winding unit 100, and winding may be performed.

Hereinafter, the winding unit 100 will be described in detail.

Figure 3:
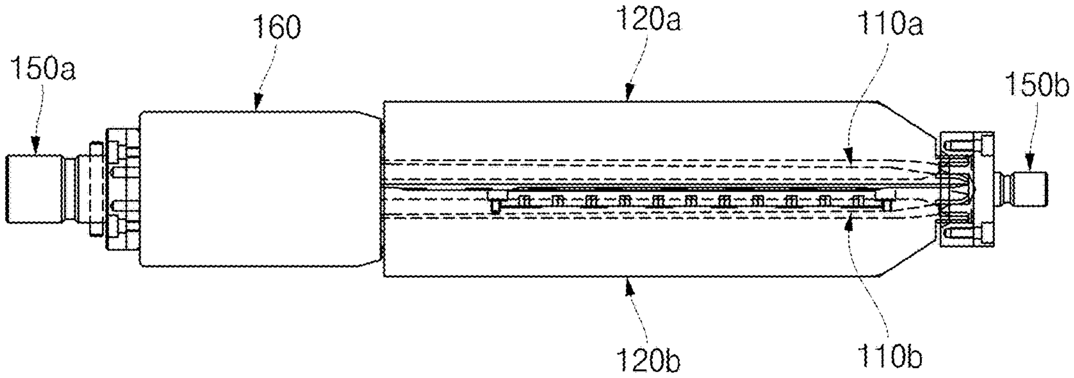
FIG. 3 is a plan view of a first clamp and a second clamp of the winding unit shown in FIG. 2.
Figure 4A:
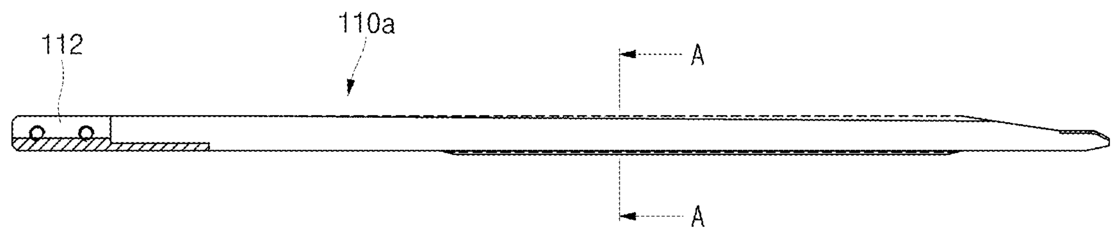
FIG. 4A is a side view of the first clamp shown in FIG. 3.
Figure 4B:
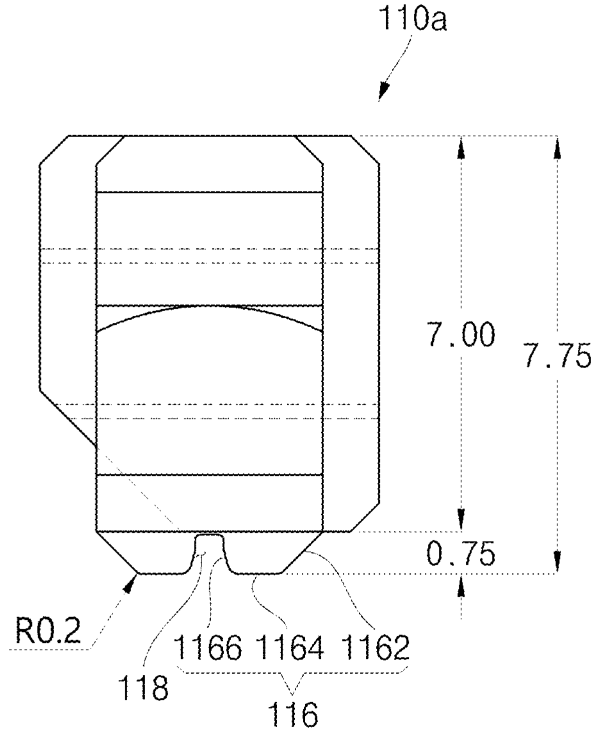
FIG. 4B is a sectional view taken along line A-A of FIG. 4A.
Figure 5A:
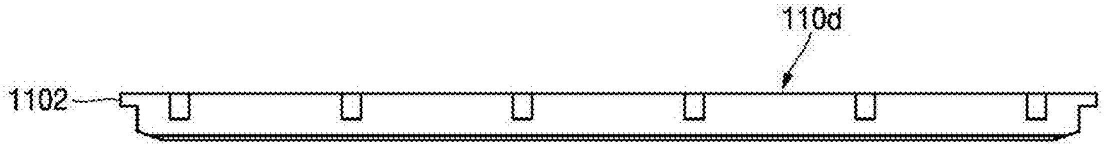
FIG. 5A is a side view of the second clamp shown in FIG. 3.
Figure 5B:
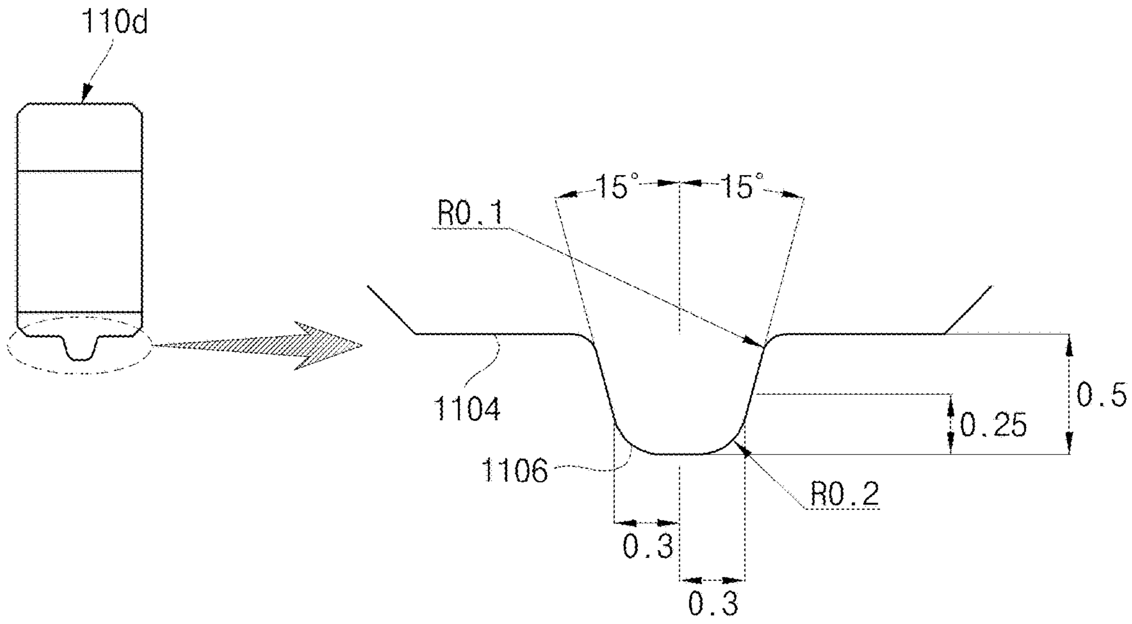
FIG. 5B is a front view of the second clamp shown in FIG. 5A.

FIG. 3 is a plan view showing a first clamp and a second clamp of the winding unit 100 in FIG. 2. FIG. 4A is a side view of the first clamp shown in FIG. 3. FIG. 4B is a sectional view taken along line A-A of FIG. 4A. FIG. 5A is a side view of the second clamp shown in FIG. 3. FIG. 5B is a front view of the second clamp shown in FIG. 5A.

Referring to FIGS. 2 and 3, the winding unit 100 may include a plurality of clamps 110*a* and 110*b*, a plurality of blades 120, and a support member to support the clamps 110*a* and 110*b* and the blades 120, e.g., a holder, a bracket, and a cover. The support member may include a pair of hinge brackets 130 coupled to the clamps 110*a* and 110*b* and the blades 120, a pair of side guide plates 140 to support rotation of the blades 120, a pair of holders 150*a* and 150*b*, a pair of top covers 160, and a pair of side covers 170. The hinge brackets 130 and the side guide plates 140 may be referred to as a driving unit (e.g., a driver) because the hinge bracket and the side guide plates rotate the clamps 110*a* and 110*b* and the blades 120 using external power.

For example, the clamps 110*a* and 110*b* may be provided as a pair, and each of the clamps 110*a* and 110*b* may be in the form of a bar having a predetermined thickness and length. Corresponding (e.g., facing) sides of the clamps 110*a* and 110*b* may be engaged with each other along the longitudinal direction to fix the electrode strip. The engaged sides of the clamps 110*a* and 110*b* may be defined as inner sides of the clamps 110*a* and 110*b* for convenience. The clamps 110*a* and 110*b* may be disposed in the center of the winding unit 100. A first end of each of the clamps 110*a* and 110*b* may be coupled to a corresponding one of the hinge brackets 130 by a coupling portion 112, and a second end of each of the clamps 110*a* and 110*b* may be inserted into and supported by one of the holders 150*a* and 150*b* while fixing a first end of the electrode strip. The first end of the electrode strip may refer to an end of the electrode strip with the first separator 3*a* and the second separator 3*b* protruding longer than the winding start end of the first electrode plate 1 and the second electrode plate 2. Only the separators of the electrode strip may be fixed to the clamps 110*a* and 110*b*. The clamps 110*a* and 110*b* may be engaged with each other with the first end of the electrode strip disposed between the pair of clamps 110*a* and 110*b*, whereby the first end of the electrode strip may be fixed to the clamps 110*a* and 110*b*. The shape of the end of each of the clamps 110*a* and 110*b*, which fix the electrode strip, will be described later.

For example, each of the clamps 110*a* and 110*b* may include a strip clamp 110*d* in direct contact with the electrode strip and a clamp holder 110*c* coupled to the strip clamp 110*d* to support the strip clamp 110*d*. In another example, the strip clamp 110*d* and the clamp holder 110*c* may be integrally formed. For example, each of the clamps 110*a* and 110*b* may be configured in a structure in which the strip clamp 110*d* and the clamp holder 110*c* are coupled to each other or are integrally formed (e.g., as a single and seamless structure). The clamps 110*a* and 110*b* may be coupled with the blades 120, and may be moved so as to hold the electrode strip or separate the electrode strip by movement of the blades 120. A first side of each of the clamps 110*a* and 110*b* may be in contact with the blades 120 (e.g., a side of each of the clamps 110*a* and 110*b* extending between the first and second ends of each of the clamps 110*a* and 110*b*), and may be defined as an outer side of each of the clamps 110*a* and 110*b* for convenience. The coupling portion 112 for coupling the first end of each of the clamps 110*a* and 110*b* to a corresponding one of the hinge brackets 130 may be formed at the first end of a corresponding one of the clamps 110*a* and 110*b* in the longitudinal direction. Each of the clamps 110*a* and 110*b* may have a shape in which the thickness thereof gradually decreases toward the second end thereof in the longitudinal direction thereof. The reduced thickness portion of each of the clamps 110*a* and 110*b* may be coupled to one of the holders 150*a* and 150*b*.

The blades 120 may be provided as a pair, and each of the blades 120 may be in the form of a bar having a predetermined thickness and length. The blades 120 may be portions on which the electrode strip is wound in contact therewith during rotation of the winding unit 100. The blades 120 may be coupled to the clamps 110*a* and 110*b*, and may at least partially surround the clamps 110*a* and 110*b*. The blades 120 may include a pair of sidewalls 122 extending toward the clamps 110*a* and 110*b* in the longitudinal direction (e.g., the sidewalls 122 may extend lengthwise in parallel to a longitudinal direction of the clamps 110*a* and 110*b*). The sidewalls 122 of the blades 120 may protrude toward outside the clamps 110*a* and 110*b*. The pair of sidewalls 122 may be spaced apart from each other by a distance sufficient to allow the clamps 110*a* and 110*b* to be inserted therebetween (e.g., both of the clamps 110*a* and 110*b* may be between two blades 120). The clamps 110*a* and 110*b* may be supported in a state of being inserted between the pair of sidewalls 122. The clamps 110*a* and 110*b* may be fixed inside the blades 120, and the electrode strip may be wound outside the blades 120 in contact therewith. A first end of each of the blades 120 in the longitudinal direction may be coupled to a corresponding one of the hinge brackets 130, and a second end of each of the blades 120 in the longitudinal direction may be inserted into a corresponding one of the holders 150*a* and 150*b* together with the second ends of the clamps 110*a* and

110*b*. The outer surface of each of the blades 120 may have a sectional shape, e.g., a streamlined shape or an angular shape having a predetermined angle.

The hinge brackets 130 may be provided as a pair, and each of the hinge brackets 130 may be coupled to a corresponding one of the blades 120. Each of the hinge brackets 130 may have a shaft 132 rotating a corresponding one of the blades 120 on an unstructured body. For example, the shaft 132 may protrude upward and downward from one end of the hinge bracket 130. A coupler 134 fixing the blade 120 may be provided on the body of the hinge bracket 130. The coupler 134 may be screwed to fix the blade 120 and the coupling portion 112 of each of the clamps 110*a* and 110*b* at once (e.g., simultaneously or together). The hinge brackets 130 may be provided with a receiving portion 136*a* and a protrusion 136*b* for mutual coupling on the surfaces of the pair of bodies that face each other. The receiving portion 136*a* and the protrusion 136*b* may be coupled to each other. The receiving portion 136*a* may have an approximate U-shape. The protrusion 136*b* may have a shape corresponding to the shape of the receiving portion 136*a*.

If the hinge bracket 130 is rotated about the shaft 132, the blade 120 coupled to the hinge bracket 130 may also be rotated. Because the clamps 110*a* and 110*b* are coupled to the blades 120, the clamps 110*a* and 110*b* may also be rotated in conjunction with rotation of the blades 120. Because the receiving portion 136*a* is U-shaped, the radius of rotation of the protrusion 136*b* may be limited (e.g., rotation of the protrusion 136*b* may be limited within the sidewalls of the U-shaped receiving portion 136*a*), whereby the hinge bracket 130 may be rotated by only a predetermined angle. Because the first end of the blade 120 is fixed to the hinge bracket 130 and the angle of rotation of the hinge bracket 130 is limited, the angle of rotation of the clamps 110*a* and 110*b* may also be limited. If the hinge bracket 130 is rotated, the second ends of the blades 120 opposite the hinge bracket 130 may be spaced apart from each other, whereby the second ends of the clamps 110*a* and 110*b* opposite the hinge bracket 130 may also be spaced apart from each other. The clamps 110*a* and 110*b* may act like scissors, and if the second ends thereof are spaced apart, the electrode strip may be inserted between the clamps 110*a* and 110*b*. If the second ends of the clamps 110*a* and 110*b* approach each other, the electrode strip may be fixed between the clamps 110*a* and 110*b*.

The holders 150*a* and 150*b* may be provided as a pair, and may be identical to or different from each other in shape. For example, a first holder 150*a* may be supporting and fix the support member, including the hinge brackets 130, and a second holder 150*b* may be fixing the second ends of the clamps 110*a* and 110*b* and the blades 120 such that the electrode strips remain fixed to the clamps 110*a* and 110*b*. The side guide plates 140, the top covers 160, and the side covers 170 may each be provided as a pair. The side guide plates 140 may be supporting rotation of the shafts 132 of the hinge brackets 130. The top covers 160 and the side covers 170 may be coupled to outsides of the hinge brackets 130 and the side guide plates 140 to protect the internal components while forming the external appearance. The support member may have any suitable configuration.

The clamps 110*a* and 110*b* may be engaged with each other to fix the electrode strip. If the frictional force between clamps and the electrode strip (the separator) is too high, the separator may fail to be ejected during ejection (separation) of the wound electrode assembly. In contrast, embodiments propose the clamps 110*a* and 110*b* with a shape capable of reliably fixing the electrode strip while minimizing friction therebetween and the contact area with the electrode strip.

FIG. 4A is a side view of a first clamp 110*a* shown in FIG. 3, and FIG. 4B is a sectional view along line A-A of FIG. 4A. FIG. 5A is a side view of a second clamp 110*b* shown in FIG. 3, and FIG. 5B is a front view of the second clamp 110*b* in FIG. 5A.

FIGS. 4A and 4B show one of the pair of clamps. For convenience, the clamp shown in FIGS. 4A and 4B will be referred to as the first clamp 110A.

As illustrated in FIG. 4B, the first clamp 110*a* may have a pair of first contact portions 116 to be in contact with the electrode strip. The pair of first contact portions 116 may symmetrically face each other with a recess 118 therebetween in a thickness direction of the first clamp 110*a* (a leftward-rightward direction of FIG. 4B). Each of the first contact portions 116 may have a first inclined surface 1162, a contact surface 1164, a second inclined surface 1166, and the recess 118. The first inclined surface 1162, the contact surface 1164, and the second inclined surface 1166 may be connected to each other. The first inclined surface 1162 may be disposed outside the first clamp 110*a*, e.g., the first inclined surface 1162 may be an outermost portion of the first clamp 110*a* contacting an exterior of the first clamp 110*a*. For example, the first inclined surface 1162 may be inclined downwardly at an angle of 45 degrees relative to a side surface of the first clamp 110*a*. The contact surface 1164 may be connected to a lower end of the first inclined surface 1162. For example, the contact surface 1164 may be parallel to an upper surface of the first clamp 110*a* (the contact surface 1164 may be at an angle of 45 degrees relative to the first inclined surface 1162). The second inclined surface 1166 may be connected to the contact surface 1164. The second inclined surface 1166 may be inclined upwardly from the contact surface 1164. For example, the second inclined surface 1166 may have an angle of approximately 90 degrees relative to the contact surface 1164.

Each of the boundary between the first inclined surface 1162 and the contact surface 1164 and the boundary between the contact surface 1164 and the second inclined surface 1166 may have a round shape with a predetermined R value. 1R refers to a value corresponding to the arc when a circle with a radius of 1 mm is drawn. For example, the R value of the boundary between the first inclined surface 1162 and the contact surface 1164 may be 0.2. Because the boundary region between the first inclined surface 1162 and the contact surface 1164 is present on both left and right sides in FIG. 4B, the R value on both sides may be 0.2. For example, referring to FIG. 4B, if the length from an upper end of the first clamp 110*a* to a starting point of the first contact portion 116 is 7 mm, the length from the starting point of the first contact portion 116 to the contact surface 1164 may be 0.75 mm. The length from the upper end of the first clamp 110*a* to the contact surface 1164 may be 7.75 mm. In the above structure, the inclined surfaces and the recess may be formed to reduce the area of the contact surface 1164 in order to reduce the contact area with the electrode strip. A second contact portion 1106 (FIG. 5B) of the second clamp 110*b* may be inserted into the recess 118 between the first contact portions 116.

Figure 6:
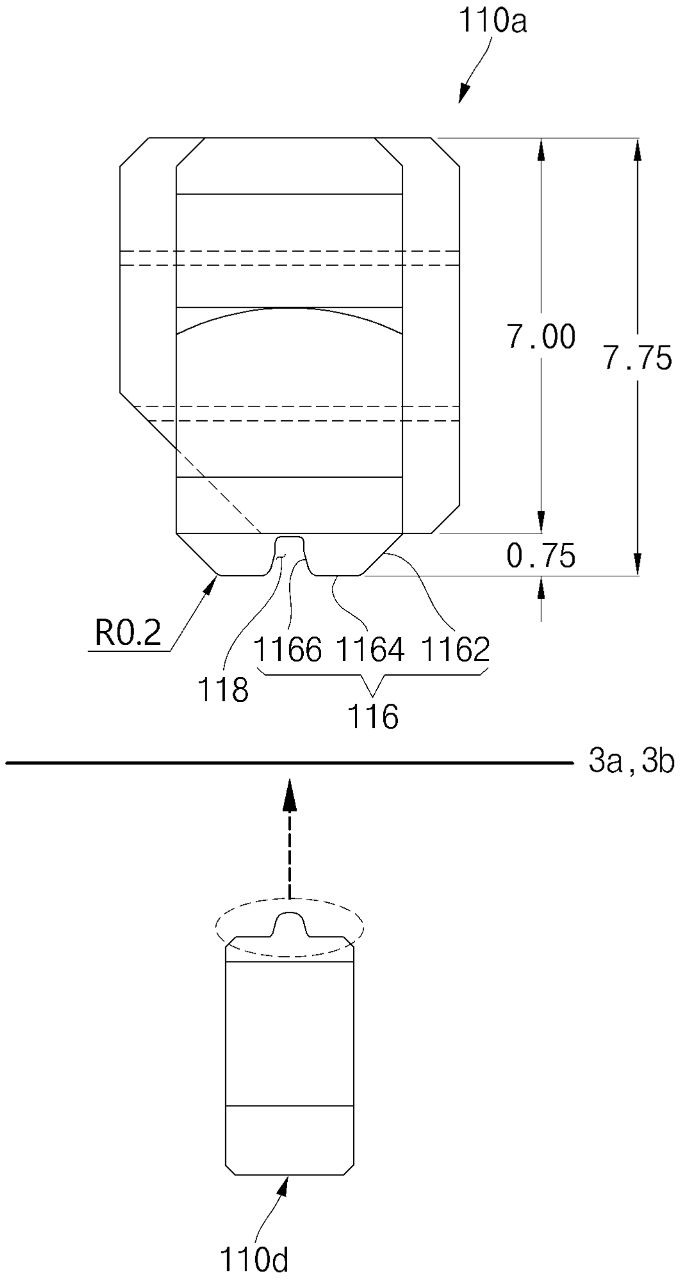
FIG. 6 is a view showing the first and second contact portions engaged.

FIGS. 5A and 5B show a part of the second clamp 110B (i.e., the strip clamp 110*d*) (only the part is shown and described for convenience because the strip clamp protrudes under the clamp holder and contacts the electrode strip). A lower surface 1104 and the second contact portion 1106 of the strip clamp 110*d* may protrude under the second clamp 110*b*. Because "under" is defined based on FIG. 5B, the protruding direction of the second contact portion 1106 may be different from the direction in which the first clamp 110A and the second clamp 110B are engaged with each other (see FIG. 6).

The second contact portion 1106 may protrude outwardly from the lower surface 1104 of the strip clamp 110*d*. An end of the second contact portion 1106 may have a rounded shape with a predetermined R value. For example, the second contact portion 1106 may protrude from the lower surface 1104 of the strip clamp 110*d* by a length of 0.5 mm. An outer R value of the end of the second contact portion 1106 may be 0.2. Because the end of the second contact portion 1106 is rounded on both left and right sides in FIG. 5B, the R value on both sides may be 0.2. Because the second contact portion 1106 is in the form of an elongated bar in FIG. 5A, the second contact portion 1106 may have an end rounded in the leftward-rightward direction of FIG. 5A (a forward-rearward direction of FIG. 5B) (four in total). In FIG. 5A, therefore, the outer R value of the end of the second contact portion 1106 on both the left and right sides may be 0.2. The R value of the boundary between the lower surface 1104 and the second contact portion 1106 may be 0.1. The angle from the boundary between the lower surface 1104 and the second contact portion 1106 to the center of the second contact portion 1106 may be 15 degrees. The length from the center of the second contact portion 1106 to the left and right ends of the second contact portion 1106 may be 0.3 mm.

The protruding end of the second contact portion 1106 of the second clamp 110*b* may be partially or fully inserted into the recess 118 between the first contact portions 116 of the first clamp 110*a* with the electrode strip interposed therebetween. Consequently, the first contact portion 116 and the second contact portion 1106 may be engaged with each other to fix the end of the electrode strip (e.g., the second contact portion 1106 of the second clamp 110*b* and the recess 118 of the first clamp 110*a* may face each other and may be engaged with each other with the electrode strip (e.g., separator) therebetween). The second contact portion 1106 may be inserted into the recess 118 (e.g., a groove) between the first contact portions 116 to the extent that separation of the electrode strip is prevented.

Conventionally, flat clamps may be engaged with each other to fix the electrode strip, whereby high friction force and a large amount of static electricity may be generated, resulting in poor ejection of the electrode assembly. In contrast, according to embodiments, the contact area between the clamp and the separator may be reduced by the aforementioned structure (i.e., the inclined surfaces and the recess), whereby it is possible to reduce poor ejection of the electrode assembly due to friction and static electricity during ejection of the electrode assembly from the winding apparatus.

By way of summation and review, static electricity may be generated depending on the material of the separator. When the electrode assembly is removed from the winding apparatus, the separator may not be properly separated from the clamp in the winding apparatus due to friction with the clamp, and therefore, a part of the separator may come out to one side of the winding center of the electrode assembly.

In contrast, embodiments provide a winding apparatus for secondary batteries capable of reducing poor ejection of an electrode assembly in a process of winding the electrode assembly. That is, according to embodiments, the shape of the clamp may be changed, whereby the contact area between the clamp and the separator may be reduced. Consequently, it is possible to reduce poor ejection of the electrode assembly due to friction and static electricity during ejection of the electrode assembly from the winding apparatus.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A winding apparatus for secondary batteries, the winding apparatus comprising:
- a first clamp including a first contact portion to be in contact with a separator in a longitudinal direction;
- a second clamp including a second contact portion to be in contact with the separator in the longitudinal direction, the second contact portion being configured to be engaged with the first contact portion;
- blades surrounding the first clamp and the second clamp, the blades being configured to allow the separator to be wound therearound; and
- a driver configured to move the first clamp and the second clamp toward each other and away from each other.

2. The winding apparatus as claimed in claim 1, wherein the first contact portion has two protrusions and a recess between the two protrusions, as viewed in a cross-sectional view.

3. The winding apparatus as claimed in claim 2, wherein the second contact portion has one protrusion protruding from a center of a surface thereof, as viewed in the cross-sectional view.

4. The winding apparatus as claimed in claim 3, wherein each of the two protrusions of the first contact portion and the one protrusion of the second contact portion has a round shape with a predetermined R value on an outside thereof.

5. A winding apparatus for secondary batteries, the winding apparatus comprising:
- a supplier configured to supply an electrode strip, the electrode strip including a first electrode plate, a second electrode plate, and separators overlapped in a predetermined order; and
- a winder including a plurality of clamps, a plurality of blades outside the plurality of clamps, and a support member coupled to the plurality of clamps and the plurality of blades, the plurality of blades being coupled to the plurality of clamps and configured to support the electrode strip wound therearound, and the support member being configured to support the plurality of clamps and the plurality of blades, wherein:
- each of the plurality of clamps has a contact portion in contact with one end of the electrode strip, and
- the plurality of clamps are engaged with each other to hold the electrode strip, wherein:
  - the plurality of clamps include:
  - a first clamp including at least one first contact portion in contact with the one end of the electrode strip, and
  - a second clamp including a second contact portion in contact with the one end of the electrode strip, and the at least one first contact portion includes a pair of first contact portions at one end of the first clamp in a longitudinal direction, the pair of first contact portions symmetrically facing each other with a recess therebetween.

6. The winding apparatus as claimed in claim 5, wherein each of the pair of first contact portions includes:

a first inclined surface inclined from one surface of the first clamp;

a contact surface connected to the first inclined surface, the contact surface being configured to be in contact with the electrode strip; and a second inclined surface connected to the contact surface, the second inclined surface being opposite the first inclined surface.

7. The winding apparatus as claimed in claim 6, wherein each of a boundary between the first inclined surface and the contact surface and a boundary between the contact surface and the second inclined surface has a round shape with a predetermined R value.

8. The winding apparatus as claimed in claim 5, wherein the second contact portion is at one end of the second clamp in a longitudinal direction, the second contact portion protruding from a center of a surface of the second clamp.

9. The winding apparatus as claimed in claim 8, wherein the second contact portion has a round shape with a predetermined R value.

10. The winding apparatus as claimed in claim 5, further comprising:

a pair of hinge brackets rotatably supporting the plurality of blades; and a pair of holders at opposite ends of the pair of hinge brackets, respectively, the pair of holders supporting the pair of hinge brackets, the plurality of clamps, and the plurality of blades.

11. The winding apparatus as claimed in claim 10, further comprising:

a pair of side guide plates facing each other, the pair of side guide plates rotatably supporting the pair of hinge brackets in opposite directions; and a pair of top covers and a pair of side covers outside the pair of side guide plates, the pair of top covers and the pair of side covers covering the pair of hinge brackets and the pair of side guide plates.

12. The winding apparatus as claimed in claim 5, wherein the electrode strip is configured such that first ends of the separators protrude longer than one end of the first electrode plate and one end of the second electrode plate in a longitudinal direction.

13. The winding apparatus as claimed in claim 12, wherein the protruding one end of the separator of the electrode strip is held by the plurality of clamps.

* * * * *